United States Patent [19]

Nozue

[11] Patent Number: 4,697,265
[45] Date of Patent: Sep. 29, 1987

[54] ERROR MONITOR CIRCUIT

[75] Inventor: Yoshihiro Nozue, Tochigi, Japan

[73] Assignee: Fujitsu Limited, Kawasaki, Japan

[21] Appl. No.: 740,326

[22] Filed: Jun. 3, 1985

[51] Int. Cl.⁴ .................. G08C 25/00; G06F 11/00
[52] U.S. Cl. .................................. 371/5; 371/56;
375/10; 375/17; 375/26
[58] Field of Search ............... 371/5, 6, 56; 375/10,
375/17, 26, 39

[56] References Cited

U.S. PATENT DOCUMENTS

| | | | |
|---|---|---|---|
| 3,772,680 | 11/1973 | Kawai | 375/26 X |
| 4,234,954 | 11/1980 | Lange | 371/5 X |
| 4,305,150 | 12/1981 | Richmond | 371/5 X |
| 4,367,550 | 1/1983 | Douverne | 371/5 |
| 4,566,100 | 1/1986 | Mizuno | 371/5 |
| 4,580,263 | 4/1986 | Watanabe | 371/5 |
| 4,583,236 | 4/1986 | Kromer | 375/17 |
| 4,602,374 | 7/1986 | Nakamura | 375/17 |

FOREIGN PATENT DOCUMENTS 1462618  1/1969  Fed. Rep. of Germany .......... 371/5
72407  6/1978  Japan ..................................... 371/5

Primary Examiner—Jerry Smith
Assistant Examiner—Robert W. Beausoliel, Jr.
Attorney, Agent, or Firm—Staas & Halsey

[57] ABSTRACT

A multi-value signal monitor circuit in a data transmitting and receiving system which transmits data after conversion into a multi-value signal and obtains the original data through analog-to-digital conversion of the received multi-value signal. The data is converted more accurately than the number of bits of data transmitted, during the analog-to-digital conversion on the receiving side. The position of the received signal relative to the quantization level is determined by utilizing the extra bits. When the extra bits indicate the multi-value signal is outside the specified range of the quantization level a pseudo error is detected. The pseudo errors are counted to produce a pseudo error rate which is used as an error rate for transmission path switching purposes.

16 Claims, 14 Drawing Figures

ERROR MONITOR CIRCUIT

BACKGROUND OF THE INVENTION

1. Field of the Invention

The present invention relates to an error monitoring apparatus provided in a system for transmitting and receiving data of plural bits as a multi-value signal and, more particularly, to a multi-value signal monitor circuit which utilizes an analog-to-digital converter for regenerating the transmitted data as well as error detection data.

2. Description of the Related Art

Various systems have been previously proposed for transmitting data of plural bits after converting it into a multi-value or multi-level signal. For example, in a digital radio transmission system utilizing quadrature amplitude modulation (QAM), I-channel data and Q-channel data are respectively converted to multi-value signals, two carriers having a phase difference of 90 degrees therebetween are amplitude modulated by the multi-value signals and combined for transmission, the received signal is quadrature-detected by a regenerated carrier which is regenerated from the received signal, the I-channel and Q-channel multi-value signals thus obtained are converted into digital signals from the analog signal to obtain the original data.

In such a transmission system, if the radio link begins to fail due to fading, etc., the error rate for the received data becomes high and if the measured error rate exceeds a specified value, the transmission line or path is switched to a spare transmission line or path or an equalizer is reset to prevent divergence of the equalizer.

One method of measuring an error rate for received data involves transmitting a particular error detection pattern and checking the accuracy of the received pattern on the receive side. However, this method has the following disadvantages:

Transmission capacity is reduced by the size of the particular error detection pattern.

A complicated circuit is required for detecting the error detection pattern.

The error rate is usually small and a long time is taken for a cycle of error rate measurement or a large time constant for integration is required for an accurate measurement and, as a result, error rate threshold crossing detection is delayed.

Another method for measuring the error rate of the received data includes using a plurality of comparators for discriminating quantization levels and other levels of the received signal, and logic circuits for logically calculating outputs of the comparators. The number of times the received signal is displaced from the quantization level at the time of sampling the received multi-value signal is measured as a pseudo error rate and is used as the error rate. However, this method requires many comparators and the necessary logic circuits become more complicated as the number of bits of data to be transmitted increases and the number of quantization levels increases.

Another method of obtaining an error rate for the received data includes performing an analog-to-digital conversion at a normal timing and also at a timing slightly shifted from the normal timing. The number of times the shifted timing sample value is different from that at the normal timing is measured as a pseudo error rate and used as the error rate. However, this method has the following disadvantages:

Two analog-to-digital converters are required for each channel, one for normal timing conversion and one for the shifted timing conversion, so that the pseudo error rate can be detected, thereby the size and cost of the circuit is increased.

Since a rate of deterioration around a quantization level after a shift from the correct sample timing is different depending on the causes of line failure (for example, multi-path-fading by a reflected wave, attenuation of the signal by rain and failure of transmitting device), accurate correspondence to the error rate cannot be obtained.

SUMMARY OF THE INVENTION

It is an object of the present invention to provide a multi-value signal supervisory circuit which measures quickly and accurately an error rate using a small scale additional circuit without reducing transmission capacity. It is another object of the present invention to provide for error rate detection without the need for error codes in a transmitted signal. An analog-to-digital converter converts the received signal into more bits than the number of bits of data transmitted. The extra or error detection bits indicate the position of the received signal with respect to an acceptable quantization level range. If the value of the extra bits falls outside the range a pseudo error detection is indicated by a detection circuit. A measuring circuit counts the number of pseudo error detections to produce a pseudo error detection rate.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1A:
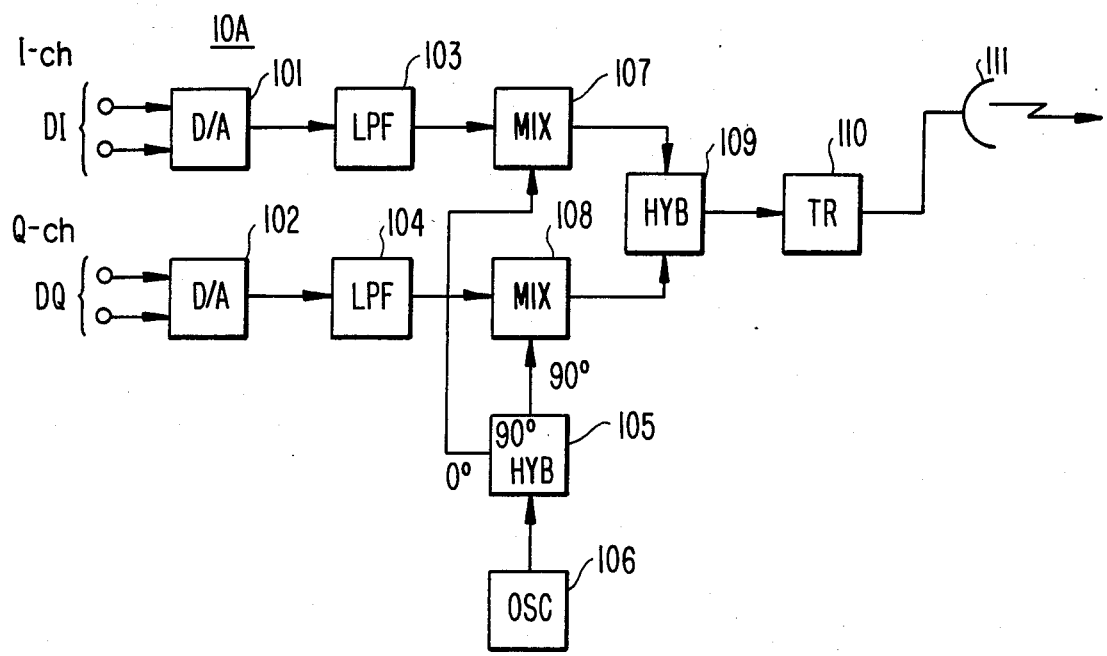
FIGS. 1A and 1B are block diagrams of a transmitting apparatus and a receiving apparatus for a 16-value QAM radio transmission system to which the present invention is applied.
Figure 2A:
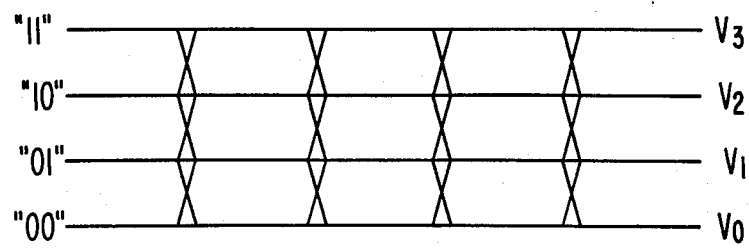
FIGS. 2A-2C are waveform diagrams of a 4-value signal in which a high frequency component is not limited or filtered out, a 4-value signal in which the high frequency component is removed and a clock signal, respectively.
Figure 2B:
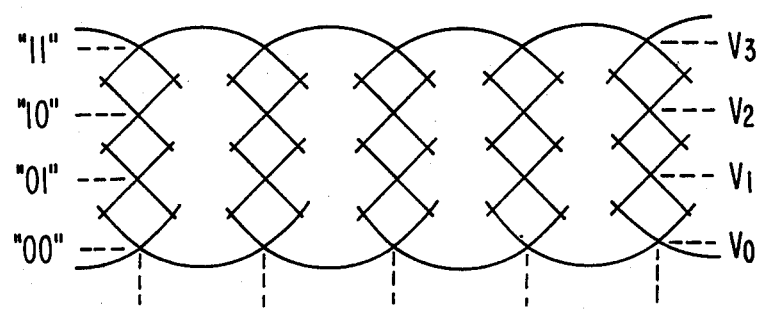

In the transmitting side apparatus 10A of the 16-value QAM radio transmission system of FIG. 1A, the digital-to-analog converters 101 and 102 respectively convert 2-bit data DI and DQ of an Inphase-channel (I-ch) and Quadrature-channel (Q-ch) into the 4-value signals shown in FIG. 2A. In FIG. 2A, $V_0$–$V_3$ indicate the quantization levels for the transmitted signals. Low-pass-filters 103 and 104 limit or remove the high frequency component of the 4-value signals and shape the waveforms, as shown in FIG. 2B. A 90° hybrid 105 divides the carrier output, from an oscillator 106 into two carriers having a phase difference of 90° therebetween. The two carriers are applied to mixers 107 and 108, which respectively amplitude modulate the two carriers with the 4-value signals in which the higher frequency components have been limited. The two modulated signals are combined in the hybrid 109 and then transmitted by a transmitter 110 and an antenna 111. All the circuits and other elements 101–111 of FIG. 1A are known to those of ordinary skill in the art and details concerning their operation and construction have been omitted for simplicity.

Figure 1B:
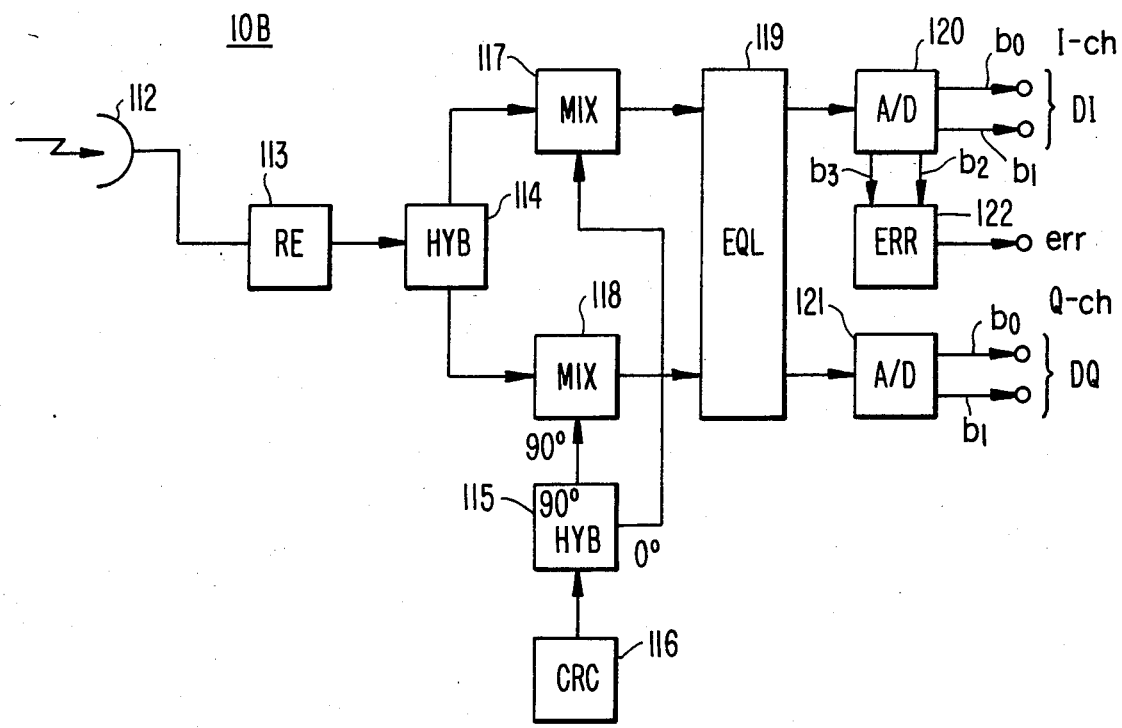
Figure 2C:
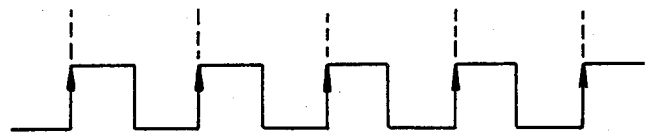

In the receiving side apparatus 10B of FIG. 1B, an incoming signal is received by an antenna 112 and a receiver 113. The received signal is divided into the I-ch and Q-ch signals by a hybrid 114. A 90° hybrid 115 produces two carriers having phase a difference of 90° therebetween from a carrier regenerated by a carrier regeneration circuit 116. The two carriers signals are applied to mixers 117 and 118 respectively, which respectively obtain the original 4-value signals by demodulating the I-ch and Q-ch received signals using the pair of regenerated carriers. The demodulated 4-value signals are similar to the modulated signals on the transmitting side shown in FIG. 2B when the line is normal. That is, if no noise or fading has occurred the demodulated 4-value signals are the same as the original 4-value signals modulated on the transmitting side 10A. Even if the transmission path starts to fail, the signal is equalized by an equalizer 119 as long as the failure is minor and, as a result, the signal is similar to that shown in FIG. 2B. A suitable carrier regeneration circuit and a suitable equalizer are described in the EPC application No. 84306977.4. The demodulated 4-value signals of I-ch and Q-ch are respectively converted by the analog-to-digital converters 120 and 121. The I-ch signal is converted into the 4 bits ($b_0$–$b_3$), while Q-ch signal is converted into bits ($b_0$ and $b_1$) respectively at the timing of the rising edge of the clock of FIG. 2C. That is, the accuracy of the sample on the I-ch side is increased by two bits. This can be accomplished by merely using two extra output bits which are available on the A/D converter 120. The respective upper two bits ($b_0$ and $b_1$) are output as the decoded data (DI and DQ) and the lower two bits ($b_2$ and $b_3$) of I-ch are output to a pseudo error rate measuring circuit 122 as pseudo error detection bits. The pseudo error rate measuring circuit 122 indicates a pseudo error when the lower bits ($b_2$ and $b_3$) indicate a range different from the quantization levels ($V_0$–$V_3$) and measures a frequency of the pseudo error as the pseudo error rate (err). The circuits and elements 112–121 of FIG. 1B are known to those of ordinary skill in the art and details concurring their operation and construction have been eliminated for simplicity.

Figure 3A:
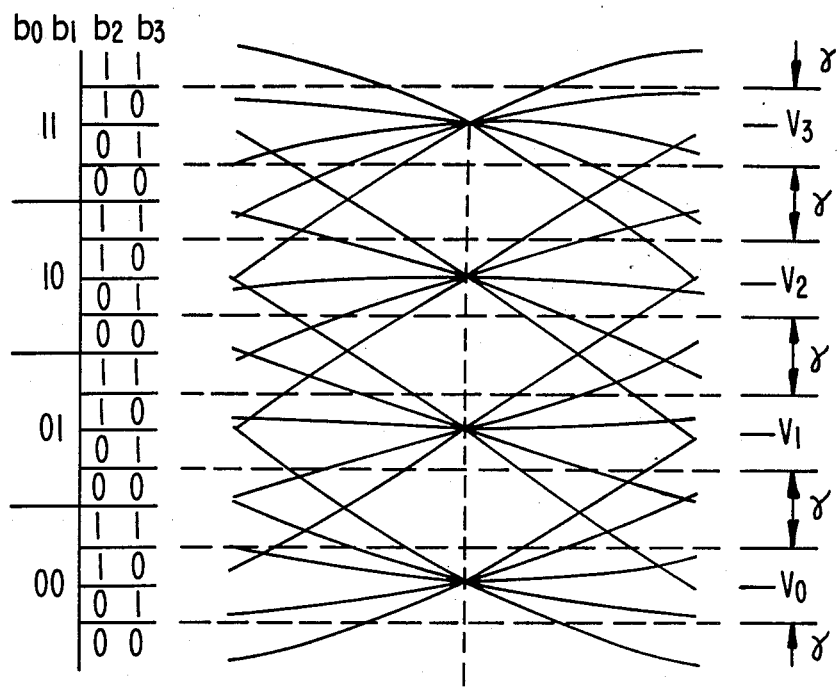
FIGS. 3A and 3B are waveform diagrams used for explaining the embodiments of the present invention.

As shown in FIG. 3A, the total range associated with each of the quantization levels ($V_0$–$V_3$) is classified into four subranges by the lower bits ($b_2$ and $b_3$). Of these subranges, the subranges indicated by the lower two bits ($b_2$ and $b_3$) having values of "00" and "11" are outside the quantization levels as indicated by $\gamma$ in the figure. When the two lower bits $b_2$ and $b_3$ have a value of "00" or "11" a pseudo error has occurred and when bits $b_2$ and $b_3$ have a value of "10" and "01" there is no pseudo error. The frequency of entering the pseudo error range is the pseudo error rate.

Figure 4F:
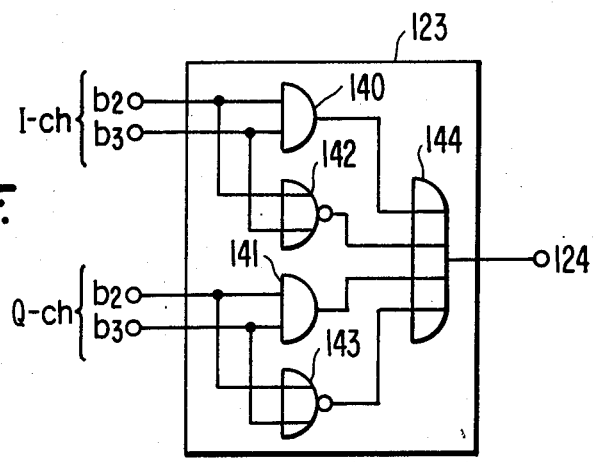
FIGS. 4A-4G are block diagrams of embodiments of the present invention.
Figure 4G:
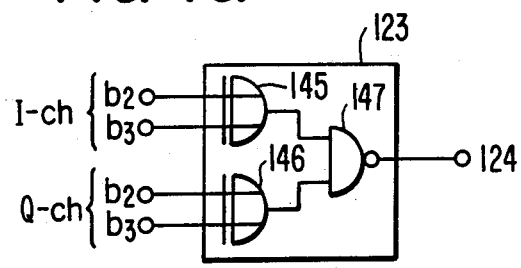
Figure 4A:
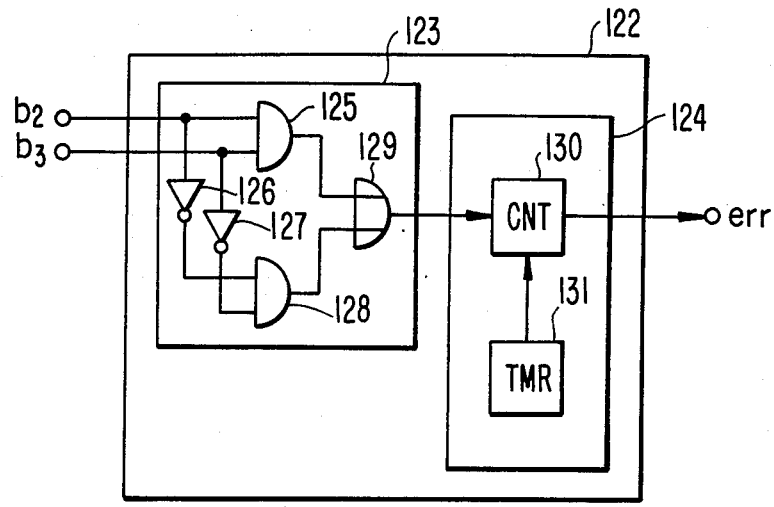

As shown in FIG. 4A, a pseudo error rate measuring circuit 122 comprises a pseudo error detection circuit 123 which receives the lower 2 bits ($b_2$ and $b_3$), produced by the analog-to-digital converter 120, and detects pseudo errors, and a measuring circuit 124 which receives the detected output produced by the pseudo error detection circuit 123 and measures the number of pseudo error detections. The pseudo error detection circuit 123 comprises a first AND circuit 125 which produces an AND of the 2 bits ($b_2$ and $b_3$), inverters 126 and 127 which respectively invert the 2 bits, a second AND circuit 128 which produces an AND of the outputs of the inverters 126 and 127 and an OR circuit 129 which produces an OR of the outputs of the AND circuits 125 and 128, and, as a result, outputs "1" when the lower 2 bits are "00" or "11". The measuring circuit 124 comprises a counter 130 which counts "1"s output by the pseudo error detection circuit 123, and a timer 131 which causes the counter 130 to output a count value periodically and also resets the counter 130. The value output by the counter 130 at the end of a constant period is the pseudo error rate. If the convergence to the quantization level deteriorates due to line or fading failure, the lower 2 bits of the analog-to-digital converter 120 increasingly become "00" or "11" and it is sufficient if the specified line switching processing is carried out when the count value exceeds the predetermined threshold value.

Figure 4B:
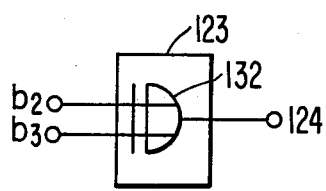

As shown in FIG. 4B, a pseudo error detection circuit 123 can be comprised of a single exclusive OR circuit 132. However, since the exclusive OR circuit 132 outputs "0" when the lower 2 bits ($b_2$ and $b_3$) are "00" or "11", the counter 130 of the measuring circuit 124 is required to count the number of times of the counter 130 input is "0" or a NOT circuit must be connected between the output of the exclusive OR circuit 132 and the counter 130.

Figure 4C:
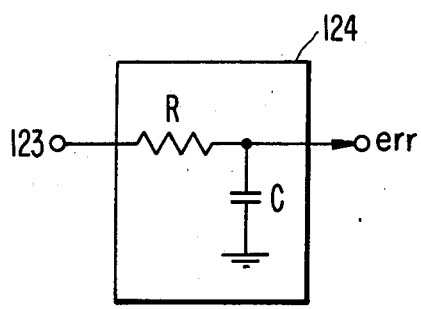

As shown in FIG. 4C, the measuring circuit 124 may alternately comprise an integration circuit including a resistor R and capacitor C and the pseudo error rate can be output as an analog value. When a pseudo error detection is input as a high voltage level, the difference between integration output and a low voltage level is the pseudo error rate, while if the pseudo error detection is input as a low voltage level, the difference between integration output and a high voltage level is the pseudo error rate.

Figure 3B:
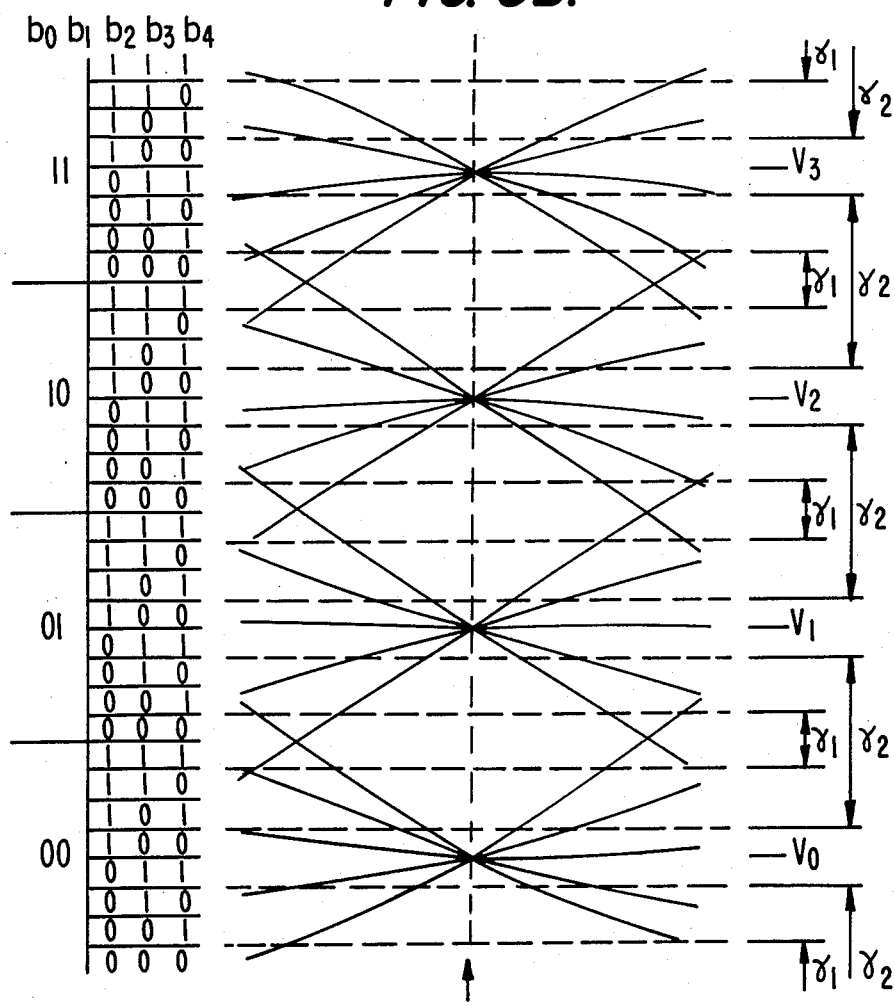

As shown in FIG. 3B, when the pseudo error detection decision is made using 3 bits which is more than the number of data bits, where the 3 bits $b_2$, $b_3$ and $b_4$ are used for pseudo error detection, it is possible to set the pseudo error detection range narrower as indicated by $\gamma_1$ or wider as indicated by $\gamma_2$.

Figure 4D:
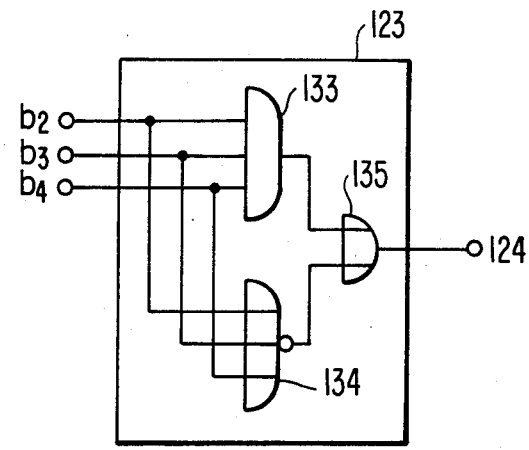

As shown in FIG. 4D, the pseudo error detection circuit which detects the range $\gamma_1$ can be composed of an AND circuit 133 which produces an AND of the 3 bits ($b_2$–$b_4$), a NOR circuit 134 which produces a NOR of the 3 bits and an OR circuit 135 which produces an OR of the outputs of the AND circuit 133 and NOR circuit 134. This error detection circuit 123 outputs "1" when the 3 bits are "b 000" or "111".

Figure 4E:
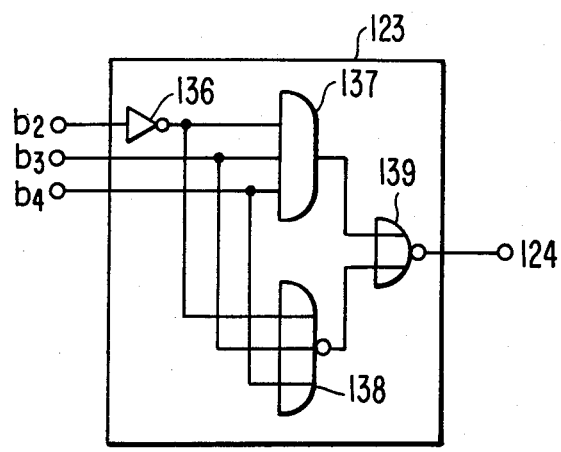

As shown in FIG. 4E, the pseudo error detection circuit 123 which detects the range of $\gamma_2$ can comprise an inverter 136 which inverts the most significant bit ($b_2$) among the 3 bits, an AND circuit 137 which produces an AND of the output of inverter 136 and the other 2 bits ($b_3$ and $b_4$), a NOR circuit which produces a NOR of the output of inverter 136 and the other 2 bits ($b_2$ and $b_3$) and a NOR circuit 139 which produces a NOR of the output of the AND circuit 137 and the output of the NOR circuit 138. This detection circuit 123 outputs "1" when the 3 bits are not "011" and "100".

If it is necessary to set the range of pseudo error detection smaller, additional bits can be connected from the A/D converter 130 to the detection circuit 123.

In FIG. 1B, only the I-ch signal is monitored, however, if the Q-ch signal must also be monitored, the monitoring can be accomplished by providing an analog-to-digital converter and pseudo error rate measuring circuit for the Q-ch which are the same as those for the I-ch. When the I-ch and Q-ch are simultaneously monitored, the pseudo error detection circuit 123, as shown in FIG. 4F, comprises AND circuits 140 and 141 which produce an AND of 2 bits ($b_2$ and $b_3$) for detecting pseudo errors of the I-ch and Q-ch, NOR circuits 142 and 143 which produce a NOR of the respective 2 bits and an OR circuit 144 which produces an OR of the outputs of the AND circuits 140 and 141 and the outputs of the NOR circuits 142 and 143. Similar logical operations can be also be accomplished by the circuit 123 shown in FIG. 4G. The pseudo error detection circuit 123 of FIG. 4G comprises exclusive OR circuits 145 and 146 which produce an exclusive OR of 2 bits of the I-ch and Q-ch and a NAND circuit 147 which produces a NAND of the outputs of the exclusive OR circuits 145 and 146. The circuit of FIG. 4G outputs "1" when 2 bits of I-ch are "00" or "11" or when 2 bits of Q-ch are "00" and "11". This output is input to the measuring circuit 124.

In these embodiments, the present invention is applied to the 16-value QAM radio transmission system but can also be adapted to any system where data is transmitted from the transmitting side after it is converted to a multi-value signal and the data is obtained in the receiving side through an analog-to-digital conversion.

As explained above, the present invention samples the data more accurately than the number of bits of data transmitted using a plurality of bits in the receiving side and detects pseudo errors from the plurality of bits. As a result a pseudo error can be detected with a simplified additional circuit and the circuit is not complicated even if the number of bits of data is increased. Moreover, an accurate error rate can be realized because data is monitored only at the normal timing of the data samples. Where the range of pseudo error detection is properly set, the frequency of generating pseudo errors will be adequate and the pseudo error rate can be detected quickly. In addition, the transmission capacity of the transmission path is not reduced because it is not necessary to transmit a particular error detection pattern used solely for error rate detection.

The many features and advantages of the invention are apparent from the detailed specification and, thus, it is intended by the appended claims to cover all such features and advantages of the circuit which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An error monitoring circuit for a transmitting and receiving system which transmits data as a multi-level signal, said circuit comprising:
analog-to-digital conversion means for samplig the multi-level signal with an accuracy greater than the accuracy at which the transmitting system converted the data into, the multi-level signal and for producing the data and error detection data; and
error detection means for determining whether the error detection data falls outside a predetermined range and producing an error rate value when outside the predetermined range.

2. A circuit as recited in claim 1, wherein said error detection means comprises:
an error detection circuit operatively connected to said analog-to-digital conversion means; and
an error measuring circuit operatively connected to said error detection circuit.

3. A circuit as recited in claim 1, wherein the data transmitted comprises at least two bits, said error detection data comprises at least two bits and said analog-to-digital conversion means comprises an analog-to-digital converter having at least two first order bit outputs which produce the data, at least two second order bit outputs which produce the error detection data and where the second order bits have a lower order than the first order bits.

4. A multi-value signal error monitoring circuit for a transmitting and receiving system where data is transmitted from the transmitting side after it is converted to a multi-value signal from a specified number of bits and the data is regenerated through conversion of the multi-value signal in the receiving side, said circuit comprising:
an analog-to-digital converter for converting the multi-value signal into first bits and second bits and the first bits having a first number of bit greater than or equal to a second number of bits, the second bits corresponding to the data; and
a pseudo error rate detection and measuring circuit, operatively connected to said analog-to-digital converter, for measuring a frequency that the first bits fall in a specified range different from quantization levels of the multi-value signal.

5. A circuit as recited in claim 4, wherein said pseudo error rate detection and measuring circuit comprises:
a pseudo error detection circuit, operatively connected to said analog-to-digital converter, for detecting whether the first bits fall within the specified range; and
a measuring circuit, operatively connected to said pseudo error detection circuit, for measuring the frequency of detection by said pseudo error detection circuit.

6. A circuit as recited in claim 4, where the transmitting system transmits two sets of data using multi-value quadrature amplitude modulation, and said analog-to-digital converter and said pseudo error rate measuring circuit are provided for at least one of the two sets of data.

7. A circuit as recited in claim 6, wherein said pseudo error rate measuring circuit comprises:
a pseudo error detection circuit for detecting whether the first bits fall within the specified range; and
a measuring circuit for measuring the frequency of detection by said pseudo error detection circuit.

8. A multi-value signal monitor circuit according to claim 6, further comprising an analog-to-digital converter for both of the two sets of data, and said pseudo error rate detection and measuring circuit comprises:

a pseudo error detection circuit, operatively connected to said analog-to-digital converters, for detecting whether the first bits from the two analog-to-digital converters fall within the specified range; and a measuring circuit, operatively connected to said pseudo error detection circuit, for detecting a frequency of detections by said pseudo error detection circuit.

9. A circuit as recited in claim 5, wherein sid pseudo error detection circuit comprises:
   a first AND circuit operatively connected to said analog-to-digital converter to receive the first bits;
   invertors operatively connected to said analog-to-digital converter to receive the first bits;
   a second AND circuit operatively connected to said invertors; and
   an OR circuit operatively connected to said first and second AND circuits.

10. A circuit according to claim 5, wherein said pseudo error detection circuit comprises:
    an AND circuit operatively connected to said analog-to-digital converter to receive the first bits;
    a NOR circuit operatively connected to said analog-to-digital converter to receive the first bits; and
    an OR circuit operatively connected to said AND circuit and said NOR circuit.

11. A circuit as recited in claim 5, wherein said pseudo error detection circuit comprises:
    an inverter operatively connected to receive a most significant bit of said first bits;
    an AND circuit operatively connected to receive a inverter and to said analog-to-digital converter, and said AND circuit receives the first bits from the anaolg-to-digital converter except for the most significant bit, the most significant bit being received after inversion by said inverter;
    a first NOR circuit operatively connected to said inverter and said analog-to-digital converter and said first NOR circuit receives the first bits from the analog-to-digital converter except for the most significant bit, the most significant bit being received after inversion by said inverter; and
    a second NOR circuit operatively connected to said AND circuit and said first NOR circuit.

12. A circuit as recited in claim 5, wherein said first bits include 2 bits and said pseudo error detection circuit comprises an exclusive OR circuit connected to receive the 2 bits.

13. A circuit as recited in claim 8, wherein said pseudo error detection circuit comprises:
    first and second AND circuits operatively connected respectively to the two analog-to-digital converters to receive the respective first bits;
    first and second NOR circuits operatively connected respectively to the two analog-to-digital converters to receive the respective first bits; and
    an OR circuit operatively connected to said first and second AND circuits and said first and second NOR circuits.

14. A circuit as recited in claim 8, wherein the first bits are 2 bits, and said pseudo error detection circuit comprises:
    first and second exclusive OR circuits operatively connected respectively to the two analog-to-digital converters to receive the 2 bits; and
    a NAND circuit operatively connected to said first and second exclusive OR circuits.

15. A circuit as recited in claim 5, wherein said measuring circuit comprises:
    a counter, operatively connected to said pseudo error detection circuit, for counting detections by said pseudo error detection circuit; and
    a timer, operatively connected to said counter, for causing said counter to periodically output a counted value and for resetting said counter.

16. A circuit as recited in claim 5, wherein said pseudo error detection circuit produces a detection output and said measuring circuit comprises an integration circuit, operatively connected to said pseudo error detection circuit, for integrating the detection output.

* * * * *

UNITED STATES PATENT AND TRADEMARK OFFICE
CERTIFICATE OF CORRECTION

PATENT NO. : 4,697,265

DATED : September 29, 1987

INVENTOR(S) : Nozue

It is certified that error appears in the above-identified patent and that said Letters Patent is hereby corrected as shown below:

Front Page, insert:

--[30] Foreign Application Priority Data
59112658         6/1/84        Japan--.

Col. 4, line 58, " b000" " should be --"000"--.

Col. 6, line 1, "samplig" should be --sampling--.

Col. 7, line 10, "sid" should be --said--.

Signed and Sealed this

Twenty-ninth Day of March, 1988

Attest:

DONALD J. QUIGG

*Attesting Officer*    Commissioner of Patents and Trademarks